US006969414B2

(12) United States Patent
Fisher

(10) Patent No.: US 6,969,414 B2
(45) Date of Patent: Nov. 29, 2005

(54) WASTE STREAM SEPARATOR

(75) Inventor: Francis P. Fisher, Evergreen, CO (US)

(73) Assignee: Technical Mechanical Resource Associates, Inc., Lakewood, CO (US)

(*) Notice: Subject to any disclaimer, the term of this patent is extended or adjusted under 35 U.S.C. 154(b) by 70 days.

(21) Appl. No.: 10/680,766

(22) Filed: Oct. 7, 2003

(65) Prior Publication Data
US 2004/0088957 A1 May 13, 2004

Related U.S. Application Data

(60) Provisional application No. 60/425,471, filed on Nov. 12, 2002.

(51) Int. Cl.[7] .............................................. B01D 36/04
(52) U.S. Cl. ...................... 55/350.1; 55/385.1; 96/159; 96/236; 96/234; 96/243; 95/149; 95/189; 210/257.1; 210/258; 210/416.1; 210/260; 210/248
(58) Field of Search ........................... 55/350.1, 385.1; 96/159, 236, 234, 243, 149, 189; 210/188, 210/258, 260, 248, 416.1, 257.1

(56) References Cited

U.S. PATENT DOCUMENTS

| | | | | |
|---|---|---|---|---|
| 1,043,455 A | * | 11/1912 | Neil | ............................ 210/779 |
| 3,130,024 A | * | 4/1964 | Vaughan, Jr. | ................. 96/236 |
| 3,658,179 A | | 4/1972 | Baumann et al. | |
| 3,756,410 A | * | 9/1973 | Moody et al. | ............... 210/139 |
| 3,786,922 A | * | 1/1974 | Materese | ..................... 210/136 |
| 4,058,479 A | | 11/1977 | White et al. | |
| 4,582,099 A | | 4/1986 | McDaniel et al. | |
| 4,867,877 A | * | 9/1989 | Hansen et al. | ............ 210/257.1 |
| 4,983,282 A | | 1/1991 | Roy et al. | |
| 5,022,995 A | | 6/1991 | Roy et al. | |
| 5,143,615 A | | 9/1992 | Roy et al. | |
| 5,149,344 A | * | 9/1992 | Macy | ........................... 96/159 |
| 5,227,060 A | | 7/1993 | Roy et al. | |
| 5,296,150 A | * | 3/1994 | Taylor, Jr. | .................... 210/708 |
| 5,395,514 A | * | 3/1995 | Siegler | ......................... 210/85 |
| 5,804,069 A | | 9/1998 | Eriksson | |
| 5,814,115 A | * | 9/1998 | Allen et al. | ................. 55/350.1 |
| 6,040,491 A | | 3/2000 | Sjowall | |
| 6,602,327 B2 | * | 8/2003 | Morse et al. | .................. 95/261 |
| 6,641,635 B1 | * | 11/2003 | Chiesl | ........................ 55/385.2 |

* cited by examiner

Primary Examiner—Duane Smith
Assistant Examiner—Minh-Chau T. Pham
(74) Attorney, Agent, or Firm—Dorr, Carson, Sloan, Birney & Kramer, P.C.

(57) ABSTRACT

A waste stream separator separates liquid and solid waste from a conveying air stream. The liquid and solid waste are first separated from the air steam by gravity and filtration in a removable primary waste barrel. The air is then drawn through a secondary waste barrel and vacuum chamber with a moisture separator and water-resistant HEPA filter to produce dry, filtered air at the output port of the system. The liquid passing through the filter media in the primary waste barrel and the liquid collecting in the secondary waste barrel can be withdrawn for further treatment. When filled with waste, the primary waste barrel can be readily removed and sealed for disposal. If necessary, polyacrylate can be injected into the primary waste barrel to convert any remaining liquid to a solid gel prior to disposal.

22 Claims, 2 Drawing Sheets

WASTE STREAM SEPARATOR

RELATED APPLICATION

The present application is based on, and claims priority to the Applicant's U.S. Provisional Patent Application Ser. No. 60/425,471, entitled "Waste Stream Separator," filed on Nov. 12, 2002.

BACKGROUND OF THE INVENTION

1. Field of the Invention

The present invention relates generally to the field of systems for separating liquid and solid wastes from a conveying air stream.

2. Statement of the Problem

Devices such as the Applicant's VAC TRAX® coating removal equipment use a high-pressure hydraulic spray and vacuum to strip paint, coatings, and debris from various types of surfaces. These devices produce a waste stream containing water and waste entrained in a conveying air stream. The waste can include particulates, liquid waste, and pieces of solid waste depending on the particular job. A need exists for an efficient and cost-effective means for separating such waste from the air stream, particularly if the waste includes radioactive material, toxic waste, or hazardous chemicals.

3. Solution to the Problem

The present invention addresses this problem by providing a system to separate liquid and solid waste and output filtered air. The filtered waste is trapped in a primary waste barrel that can be readily removed and sealed for transportation and disposal.

SUMMARY OF THE INVENTION

This invention provides a waste stream separator for separating liquid and solid waste from a conveying air stream. The liquid and solid waste are first separated from the air steam by gravity and filtration in a removable primary waste barrel. The air is then drawn through a secondary waste barrel and vacuum chamber with a moisture separator and water-resistant HEPA filter to produce dry, filtered air at the output port of the system. The liquid passing through the filter media in the primary waste barrel and the liquid collecting in the secondary waste barrel can be withdrawn for further treatment. When filled with waste, the primary waste barrel can be readily removed and sealed for disposal. If necessary, polyacrylate can be injected into the primary waste barrel to convert any remaining liquid to a solid gel prior to disposal.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
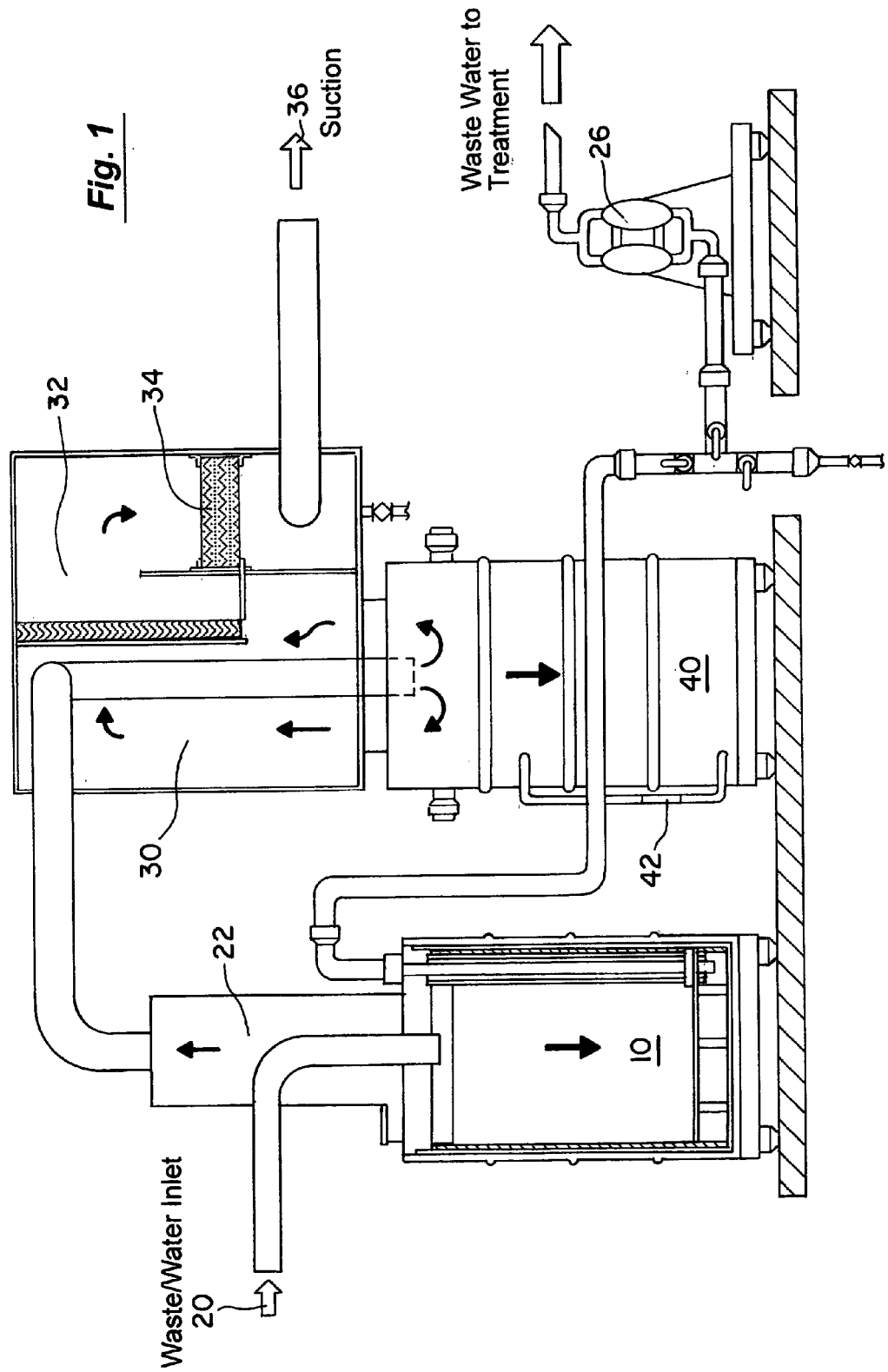
FIG. 1 is a vertical cross-sectional view of the present system.

Turning to FIG. 1, a cross-sectional view is provided of the entire system. The function of the waste stream separator is to capture and separate the waste product and water removed by the VAC TRAX® device during surface stripping operations. In particular, the water stream separator is designed to separate liquid and solid wastes from the conveying air stream and also scrub the air stream of condensation and particulates. The present system includes a primary waste barrel 10 with a separation stack 22, a condensing/filtering vacuum chamber 30, and a secondary waste barrel 40 for collecting drips.

The waste inlet hose 20 of the present system is connected to the VAC TRAX® device and receives a mixture of air, water, and waste. Initially, the primary waste barrel 10 and separation stack 22 separate the liquid and solid waste by gravity from the conveying air stream exiting the VAC TRAX® device. The air is drawn up the separation stack 22 and into the vacuum chamber 30. An external suction source connected to the exhaust port 36 leading from the vacuum chamber 30 maintains reduced pressure within the enclosed region and withdraws moisture-free, HEPA-filtered air from within the vacuum chamber 30, as will be described below.

Figures 2, 2A:
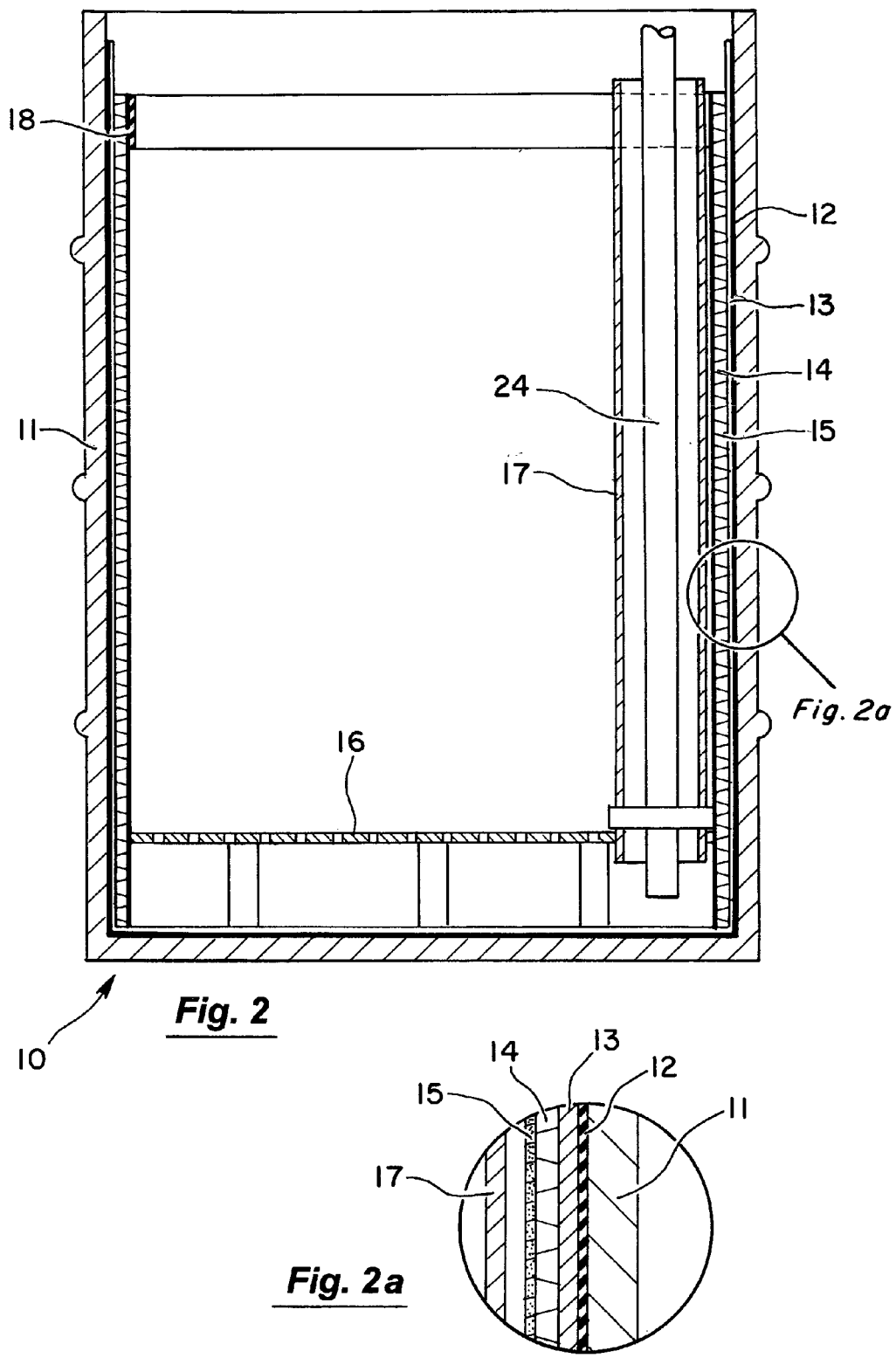
FIG. 2 is a vertical cross-sectional view of the primary waste barrel assembly 10.
FIG. 2A is a detail cross-sectional view of a portion of the side wall of the barrel assembly 10.

The solid and liquid waste flows by gravity into the primary waste barrel 10 below the separation stack 22. The primary waste barrel assembly 10 is shown in greater detail in the cross-sectional views provided in FIGS. 2 and 2A. For example, the primary waste barrel assembly 10 can be a standard 55-gallon steel barrel 11 containing a plastic barrel liner 12 and a rigid polyethylene liner 13 to minimize any risk of leakage. A filtration kit is housed within the primary waste barrel 10 that includes a filter media 15 and perforated drain boards 14 having protrusions, ribs, or ridges to maintain a separation between the interior wall of the barrel 10 and the filter media 15. The drain boards 14 help to hold the filter media 15 in position and allow free drainage from within the barrel during operation of the system. Without the protrusions, the filter media 15 would tend to adhere to the sides of the barrel. This would reduce suction pressure and render the primary waste barrel assembly 10 less effective as a filtering device.

A perforated drain plate 16 in the bottom of the primary waste barrel 10 supports the bottom of the filter media 15 and the waste contained therein, and also maintains space in the bottom of the primary waste barrel 10 to facilitate drainage of liquid through the filter media 15. For example, the filter media 15 can be a nylon bag having a suitable mesh size. Multi-layer filter media can also be used to provide a degree of rigidity to help prevent the filter media 15 from being drawn into the protrusions of the drain boards 14 by the pressure difference across the filter media 15, which might interfere with drainage along the sides of the primary waste barrel 10.

The primary waste barrel 10 is also equipped with a suction standpipe 17 that extends through the perforated drain plate 16 beneath the filter media 15. The upper opening of the primary waste barrel 10 is covered by the separation stack 22 while the unit is in operation. The separation stack 22 can be raised and lowered relative to the primary waste barrel 10 by means of pneumatic cylinders to enable the primary waste barrel 10 to be replaced when full. A stinger tube 24 connected to a drain pump 26 extends downward from the separation stack 22 and is inserted through the suction standpipe 17 into the drainage space beneath the drain plate 16 when the separation stack 22 is lowered into place atop the barrel 10. During operation of the unit, the stinger tube 24 is used to extract liquid from beneath the drain plate 16 for treatment and/or recycling.

A retaining ring 18 extends around the interior of the barrel adjacent to its upper opening. The retaining ring 18 supports the filter media 15 and also maintains a seal with the separation stack 22 in its lowered position.

As previously discussed, the waste stream entering the inlet of the separation stack 22 is drawn downward into the primary waste barrel 10 by the gravity and negative pressure within the separation stack 22. Solid wastes fall out of the waste stream and are trapped in the filter media 15. The liquid portion of the waste stream flows through the filter bag 15, down the side drain boards 14, and collects at the bottom of the barrel 10 beneath the elevated drain plate 16. Liquid also drains through the bottom of the filter bag and perforations in the drain plate 16. The drain pump 26 pumps the waste liquid via the stinger tube 24 to interim storage or a treatment facility.

In contrast, the air stream is drawn by suction out of the separation stack 22. A moisture separator 32 situated vertically within the vacuum chamber 30 partitions the interior of the vacuum chamber 30 into front and back passes. The air stream is initially drawn downward at the inlet of the vacuum chamber 30 by negative pressure through the secondary waste barrel 40, which removes any entrained droplets of moisture by gravity and inertial separation. The secondary waste barrel 40 is fitted with a sight glass 42 and drain connections so that the secondary waste barrel 40 can be pumped out as required. Additionally, the secondary waste barrel 40 will capture any overflow from the primary waste barrel 10 and prevent it from entering the vacuum chamber 30 and HEPA filter 34.

From the secondary waste barrel 40, the air flow then passes upward into the front pass of the vacuum chamber 30 and through the moisture separator 32. Condensation drops out of the air stream and drains into the secondary waste barrel 40. Air entering the back pass of the vacuum chamber 30 is directed downward through a horizontally-mounted water-resistant HEPA filter before exiting through the exhaust port 36. Any residual condensation is captured by a basin or drain located at the bottom of the back pass of the vacuum chamber 30.

The primary waste barrel 10 is intended to be disposable after it has been filled during the filtration process. The separation stack 22 and cover can be raised by pneumatic cylinders to allow the filled primary waste barrel 10 to be removed and replaced with a new primary waste barrel 10. If desired, the primary waste barrel 10 can be filled with an absorbent material or a gelling agent (e.g., polyacrylate, such as Waste Lock™, Aquasorb™, or Waterworks Crystals™) to convert any remaining liquid in the barrel 10 into a solid gel. Alternatively, a mineral-based solidifying agent, such as Zorbent™, could be used for this purpose. The entire primary waste barrel assembly (including the filter media 15, drain plate 16, drain boards 14, and stand pipe 17) is enclosed by sealing a barrel lid to the open upper end of the primary water barrel 10. The barrel can then be transported for treatment or storage.

The above disclosure sets forth a number of embodiments of the present invention. Other arrangements or embodiments, not precisely set forth, could be practiced under the teachings of the present invention and as set forth in the following claims.

I claim:

1. A system for separating liquid and solid waste from a conveying air stream comprising:
   a removable primary waste barrel having filter media for separating solid waste from liquid;
   a separation stack detachably mounted above the primary waste barrel to allow removal of the primary waste barrel, said separation stack having an inlet directing an air stream with entrained liquid and solid waste downward into the primary waste barrel;
   a drain pump for removing liquid accumulating in the primary waste barrel;
   a secondary waste barrel; and
   a vacuum chamber directing the air stream from the separation stack downward into the secondary waste barrel to remove entrained droplets of moisture.

2. The system of claim 1 wherein the primary waste barrel further comprises a perforated drain plate spaced above the bottom of the primary waste barrel to support the filter media.

3. The system of claim 1 wherein the primary waste barrel further comprises a perforated drain board surrounding the filter media around the interior surface of the primary waste barrel.

4. The system of claim 3 wherein the perforated drain board further comprises protrusions maintaining a separation for drainage of liquid within the primary waste barrel.

5. The system of claim 1 wherein the primary waste barrel further comprises a stand pipe extending upward within the primary waste barrel to allow liquid to be withdrawn from the bottom of the primary waste barrel.

6. The system of claim 5 wherein the separation stack further comprises a stinger tube removably insertable through the stand pipe and extending into the liquid collecting in the bottom of the primary waste barrel.

7. The system of claim 1 wherein the vacuum chamber further comprises a moisture separator.

8. The system of claim 1 wherein the vacuum chamber further comprises an air filter.

9. The system of claim 1 wherein the primary waste barrel has an upper opening and wherein the separation stack removably covers the upper opening of the primary waste barrel.

10. The system of claim 1 wherein the primary waste barrel further comprises a liner.

11. A system for separating liquid and solid waste from a conveying air stream comprising:
   a removable primary waste barrel having:
   (a) a perforated drain plate spaced above the bottom of the primary waste barrel;
   (b) filter media supported by the perforated drain plate to separate solid waste from liquid collecting in the primary waste barrel;
   (c) a perforated drain board surrounding the filter media around the interior surface of the primary waste barrel, allowing liquid to drain into the bottom of the primary waste barrel; and
   (d) a stand pipe extending upward within the primary waste barrel to allow liquid to be withdrawn from the bottom of the primary waste barrel;
   a separation stack detachably mounted above the primary waste barrel to allow removal of the primary waste barrel, said separation stack having:
   (a) an inlet directing an air stream with entrained liquid and solid waste downward into the primary waste barrel; and
   (b) a stinger tube removably insertable through the stand pipe and extending into the liquid collecting in the bottom of the primary waste barrel; and a drain pump for removing liquid accumulating at the bottom of the primary waste barrel through the stinger tube inserted through the stand pipe.

12. The system of claim 11 wherein the perforated drain board surrounds the filter media and further comprises protrusions maintaining a separation for drainage of liquid within the primary waste barrel.

13. The system of claim 11 further comprising an air filter filtering the air stream exiting the separation stack.

14. The system of claim 11 wherein the primary waste barrel has an upper opening and wherein the separation stack removably covers the upper opening of the primary waste barrel.

15. The system of claim 11 further comprising:
a secondary waste barrel; and
a vacuum chamber directing the air stream from the separation stack downward into the secondary waste barrel to remove any entrained droplets of moisture.

16. The system of claim 11 wherein the primary waste barrel further comprises a liner.

17. A system for separating liquid and solid waste from a conveying air stream comprising:
a removable primary waste barrel having filter media for separating solid waste from liquid;
a separation stack detachably mounted above the primary waste barrel to allow removal of the primary waste barrel, said separation stack having an inlet directing an air stream with entrained liquid and solid waste downward into the primary waste barrel;
a drain pump for removing liquid accumulating in the primary waste barrel;
a secondary waste barrel; and
a vacuum chamber mounted above the secondary waste barrel having:
(a) an inlet directing the air stream from the separation stack downward into the secondary waste barrel to remove entrained droplets of moisture;
(b) a moisture separator removing moisture for the gas stream exiting the secondary waste barrel; and
(c) an air filter removing particulates from the gas stream exiting the secondary waste barrel.

18. The system of claim 17 wherein the primary waste barrel further comprises a perforated drain plate spaced above the bottom of the primary waste barrel to support the filter media.

19. The system of claim 17 wherein the primary waste barrel further comprises a perforated drain board surrounding the filter media around the interior surface of the primary waste barrel.

20. The system of claim 19 wherein the perforated drain board further comprises protrusions maintaining a separation for drainage of liquid within the primary waste barrel.

21. The system of claim 17 wherein the primary waste barrel further comprises a stand pipe extending upward within the primary waste barrel to allow liquid to be withdrawn from the bottom of the primary waste barrel.

22. The system of claim 21 wherein the separation stack further comprises a stinger tube removably insertable through the stand pipe and extending into the liquid collecting in the bottom of the primary waste barrel.

* * * * *